United States Patent [19]

Perry et al.

[11] Patent Number: 4,574,119

[45] Date of Patent: Mar. 4, 1986

[54] CHROME-MAGNESITE REFRACTORIES AND METHOD OF PREPARATION

[75] Inventors: John D. Perry, Calumet, Canada; David J. Michael, White Oak, Pa.

[73] Assignee: Dresser Industries, Inc., Dallas, Tex.

[21] Appl. No.: 619,671

[22] Filed: Jun. 11, 1984

[51] Int. Cl.$^4$ .............................................. C04B 35/12
[52] U.S. Cl. ..................................... 501/114; 501/117
[58] Field of Search ................................ 501/114, 117

[56] References Cited

U.S. PATENT DOCUMENTS

| | | | |
|---|---|---|---|
| 1,845,968 | 2/1932 | Heur .................................... | 501/114 |
| 2,053,146 | 9/1936 | Harvey et al. ........................ | 501/114 |
| 2,077,796 | 4/1937 | Harvey et al. ........................ | 501/114 |
| 2,270,220 | 1/1942 | Pitt et al. .............................. | 501/114 |
| 3,180,743 | 4/1965 | Davies et al. ......................... | 501/114 |
| 3,192,058 | 6/1965 | Davies et al. ......................... | 501/114 |

*Primary Examiner*—Howard S. Williams
*Attorney, Agent, or Firm*—Barry E. Deutsch

[57] ABSTRACT

A refractory brick made from a size graded batch comprising 20–30 weight percent magnesite containing less than 0.8 weight percent silica, and the balance a chrome ore. The chrome ore includes oxides of chromium, aluminum and iron wherein the ratio between the oxides of chromium and the oxides of aluminum and iron is greater than 2 to 1. The silica content of the chrome ore is less than 2.7 weight percent, the iron oxide content is less than 17 weight percent, and the chrome ore to magnesite ratio is between 2.33 to 4 to 1.

4 Claims, No Drawings

CHROME-MAGNESITE REFRACTORIES AND METHOD OF PREPARATION

BACKGROUND OF THE INVENTION

This invention relates to chrome-magnesite refractories and more particularly to chrome-magnesite refractories that have a controlled chemistry that makes them particularly resistant to siliceous slags. In the broad aspect, this invention relates to the control of the ratio of the oxide of chromium to the oxides of iron and aluminum, the total iron oxide, and silica content of the refractory, and the ratio between the chromite and the magnesia.

It is well known that numerous patents have been granted on various compositions of burned chrome ore and magnesite. Several of the earliest patents in this field that covered brick with a high percentage of chrome ore are U.S. Pat. Nos. 1,845,968 and 2,053,146. Brick in U.S. Pat. No. 2,077,796, were made with high silica content to form forsterite to bond the chrome ore and magnesite, while U.S. Pat. No. 2,270,220 discloses the use of dicalcium silicate to bond chrome ore and magnesite.

Since these early developments of chrome-magnesite refractories, there have been numerous changes in metallurgical practices, which typically operate at higher temperatures in the presence of highly corrosive slags. With this progress and improvement in the metallurgical industry, where chrome-magnesite brick are often used, there has been concomitant progress in the refractory art. Rebonded fused chrome-magnesite brick compositions as well as chrome-magnesite brick with fine chromic oxide additions, as described in U.S. Pat. No. 3,192,058, have been developed. These compositions have improved slag resistance, but they are substantially more expensive than conventional chrome-magnesite brick.

Accordingly, an object of this invention is a chrome-magnesite composition having high resistance to siliceous slags as occur in the copper industry, particularly those that occur in copper converters.

It is still a further object of this invention to provide a method for producing a burned refractory where the principal phases are chrome ore and magnesite, with control of the ratio of the chromium oxide to the oxides of iron and aluminum without the addition of chromic oxide, and also with control of the total iron oxide, and silica content and the ratio between the chromite and magnesia.

According to this invention, burned brick are made from a size graded batch comprising 20–30 weight percent magnesite containing less than 0.8 weight percent silica, and the balance a chrome ore whose ratio between the oxides of chromium and the oxides of aluminum and iron is greater than 2 to 1, the silica content of the ore is less than 2.7 weight percent, the iron oxide content is less than 17 weight percent, and the chrome ore to magnesite ratio is between 2.33 to 4 to 1.

DETAILED DESCRIPTION OF THE PREFERRED EMBODIMENT

The chrome ore is a beneficiated product with a major portion of the silica removed. The magnesite is extremely pure, containing up to 99 percent MgO. Typical chemical analyses of the raw materials used in the refractory of this invention are shown in Table I. The silica content of the chrome ore may vary from 1.7 to 2.7 weight percent, but the composition shown is typical. Two types of magnesite are shown and both are acceptable.

TABLE I

|  | Chrome Ore X | Magnesite A | Magnesite B |
|---|---|---|---|
| Chemical Analysis (Calcined Basis) | | | |
| Silica ($SiO_2$) | 2.0% | 0.13% | 0.75% |
| Alumina ($Al_2O_3$) | 10.7 | 0.09 | 0.18 |
| Titania ($TiO_2$) | 0.13 | 0.01 | 0.01 |
| Iron Oxide ($Fe_2O_3$) | 14.8 | 0.40 | 0.18 |
| Chromic Oxide ($Cr_2O_3$) | 56.9 | — | — |
| Lime (CaO) | 0.10 | 0.68 | 0.48 |
| Magnesia (MgO) | 15.7 | 98.70 | 98.41 |
| Total Analyzed | 100.06% | 100.00% | 100.00% |

For comparative purposes, typical chemical analyses of Philippine chrome ore and refractory grade magnesite that are representative of materials used in the chrome-magnesite brick of the prior art are listed in Table II.

TABLE II

|  | Philippine Lump Chrome Ore | Magnesite C |
|---|---|---|
| Chemical Analysis (Calcined Basis) | | |
| Silica ($SiO_2$) | 6.00% | 3.0% |
| Alumina ($Al_2O_3$) | 27.0 | 0.4 |
| Titania ($TiO_2$) | 0.21 | <0.01 |
| Iron Oxide ($Fe_2O_3$) | 14.9 | 0.5 |
| Chromic Oxide ($Cr_2O_3$) | 31.4 | <0.01 |
| Lime (CaO) | 0.50 | 0.9 |
| Magnesia (MgO) | 19.5 | 95.0 |
| Total Analyzed | 99.51% | 99.8% |

The chrome ore is basically sized to pass through a 4 mesh screen, although a portion may be added as ball milled fines. The magnesia will be basically added as ball milled fines either as straight magnesite or as a ball milled preburned mixture of magnesia and chrome ore, often referred to as "bats". In certain cases, magnesia may be added to the batch as a coarse fraction. However, there must always be enough magnesia in the ball milled fraction to insure reaction to spinel minerals by the $R_2O_3$ constituents in the chrome ore. This results in good burning stability and slag resistance.

A series of four chrome-magnesite brick designated Mixes A, B, C and D were made with varying ratios of chrome ore X and magnesite A as shown in Table III. In addition, data for two conventional chrome-magnesite brick that are representative of prior art are listed in the table as Mixes E and F. The brick were made from size graded batches using common brickmaking procedures, such as adding a bonding agent such as calcium lignosulfonate, pressing the brick at 12,000 psi, drying the brick and then burning them in a tunnel kiln.

TABLE III

| Mix Designation: | | A | B | C | D | Conventional Low-Fired Chrome-Magnesite Brick | |
|---|---|---|---|---|---|---|---|
| | | | | | | E | F |
| Chrome Ore/Magnesite Ratio: | | 95/5 | 90/10 | 80/20 | 70/30 | 80/20 | 74/26 |
| Mix Composition: | | | | | | | |
| Chrome Ore X | −4/+10 mesh | 35% | 35% | 35% | 35% | — | — |
| | 010/+28 mesh | 17 | 17 | 17 | 17 | — | — |
| | −28 mesh | 28 | 28 | 28 | 18 | — | — |
| | Ball Milled Fines | 15 | 10 | — | — | — | — |
| Magnesite A | −28 mesh | — | — | — | 11 | — | — |
| | Ball Milled Fines | 5 | 10 | 20 | 19 | — | — |
| Philippine Lump Chrome Ore | | | | | | | |
| | −4/+8 mesh | — | — | — | — | 24% | 24% |
| | −8/+28 mesh | — | — | — | — | 26 | 26 |
| | −28 mesh | — | — | — | — | 30 | 24 |
| Magnesite C | Ball Milled Fines | — | — | — | — | 20 | 26 |
| Burning Temperature, °F.: | | 3130 | 3130 | 3130 | 3130 | 2800 | 2800 |
| Bulk Density, pcf: | | 217 | 215 | 211 | 206 | 193 | 193 |
| Drip Slag Test at 2650° F. (Reducing Conditions Using 1600 Grams of Copper Convertor Slag) | | | | | | | |
| Volume of Erosion in cu cm: | | Bloated | Bloated | 21 | 16 | 30 | 41 |
| Chemical Analysis (Calcined Basis) | | | | | | | |
| Silica (SiO$_2$) | | 1.91% | 1.82% | 1.63% | 1.44% | 5.6% | 5.0% |
| Alumina (Al$_2$O$_3$) | | 9.69 | 9.19 | 8.58 | 7.52 | 22.5 | 20.9 |
| Iron Oxide (Fe$_2$O$_3$) | | 14.56 | 13.82 | 11.92 | 10.5 | 12.1 | 10.5 |
| Chromic Oxide (Cr$_2$O$_3$) | | 53.20 | 50.40 | 45.52 | 39.8 | 26.8 | 25.2 |
| Lime (CaO) | | 0.12 | 0.15 | 0.22 | 0.28 | 1.4 | 1.1 |
| Magnesia (MgO) | | 19.76 | 23.92 | 32.3 | 40.6 | 31.6 | 73.3 |
| Total Analyzed | | 99.24% | 99.30% | 100.17% | 100.14% | 100.0% | 100.0% |

Mixes A, B, C and D were burned at the relatively high temperature of 3130° F. while Mixes E and F, the conventional brick, were only burned at 2800° F. The higher burning temperature for Mixes A, B, C and D was made possible by the controlled chemistry described earlier. More specifically, the substantially lower silica content and control of the ratio of chromic oxide to the oxides of iron and aluminum to greater than 2 to 1 make it possible to burn Mixes A, B, C and D at the higher temperature. The higher silica contents and low ratio of chromic oxide to the oxides of iron and aluminum make it necessary to burn Mixes E and F at the lower temperature. Because of their favorable chemistry, Mixes A, B, C and D can be burned at 3130° F. without resulting in the brick sticking together. Brick from Mixes E and F, because of their unfavorable chemistry, stick together if burned at 3130° F. The ability to burn chrome-magnesite brick at temperatures as high as 3130° F. and the controlled chemistry described earlier results in brick with improved slag resistance.

The slag resistance of these mixes was tested using ASTM test method C 768. In the test, 1600 grams of copper converter slag were dripped onto the brick at 2650° F. After cooling, the cubic centimeters of brick removed by erosion were measured. The chemistry of the copper converter slag used in this testing is listed in Table IV.

TABLE IV

| | Copper Converter Slag |
|---|---|
| Chemical Analysis (Calcined Basis) | |
| Silica (SiO$_2$) | 27.7% |
| Alumina (Al$_2$O$_3$) | 5.92 |
| Titania (TiO$_2$) | 1.79 |
| Iron Oxide (Fe$_2$O$_3$) | 56.4 |
| Chromic Oxide (Cr$_2$O$_3$) | 0.52 |
| Manganese Oxide (MnO) | 0.27 |
| Copper Oxide (CuO) | 4.2 |
| Lime (CaO) | 2.36 |
| Magnesia (MgO) | 0.43 |

TABLE IV-continued

| | Copper Converter Slag |
|---|---|
| Total Alkalies | 0.41 |
| Total Analyzed | 100.0% |

As is evident from Table III, Mixes C and D, made according to this invention, had substantially lower erosion in the drip slag test than Mixes E and F, the conventional chrome-magnesite brick. In addition, slag testing results on Mixes A and B illustrate the unsuitability of high fired chrome-magnesite brick made with insufficient magnesia. Both Mixes A and B were severely bloated as a result of the slag test.

While a preferred embodiment of the invention has been described, the invention should not be limited thereto, but may be otherwise embodied within the scope of the following claims.

The embodiments of the invention in which an exclusive property or privilege is claimed are defined as follows:

1. A refractory brick made from a size graded batch comprising 20-30 weight percent magnesite containing less than 0.8 weight percent silica, and the remainder a chrome ore whose ratio between the oxides of chromium and the oxides of aluminum and iron is greater than 2 to 1, having a silica content less than 2.7 weight percent, an iron oxide content less than 17 weight percent, and wherein the chrome ore to magnesite ratio is between 2.33 and 4 to 1.

2. A refractory brick in accordance with claim 1 wherein the silica content of the chrome ore is less than 2.3 weight percent.

3. A refractory brick in accordance with claim 1 wherein the brick is used to line a copper converter.

4. A method of manufacturing a refractory brick comprising the steps of:
   mixing a magnesite ore containing less than 0.8 weight percent silica, and a chrome ore whose ratio between the oxides of chromium and the oxides of aluminum and iron is greater than 2 to 1, the silica content is less than 2.7 weight percent, the iron oxide content is less than 17 weight percent and the ratio between the chrome ore and magnesite is between 2.33 and 4 to 1, wherein the batch comprises 20–30 weight percent magnesite and the balance the chrome ore;

adding bond to the batch;

pressing the brick-like structures at elevated pressures;

drying the brick-like structures; and burning the brick-like structures at a temperature in excess of 3000° F. to form the finished refractory brick.

* * * * *